US012007339B2

(12) United States Patent
Case et al.

(10) Patent No.: US 12,007,339 B2
(45) Date of Patent: Jun. 11, 2024

(54) SAMPLE HOLDER, SYSTEM AND METHOD

(71) Applicant: Carl Zeiss SMT Inc., Pleasanton, CA (US)

(72) Inventors: Thomas Anthony Case, Walnut Creek, CA (US); Susan Candell, Lafayette, CA (US); Naomi Kotwal, Dublin, CA (US); Allen Gu, Pleasanton, CA (US); Zheren Wu, San Jose, CA (US); Wayne Broderick, Pleasanton, CA (US)

(73) Assignee: Carl Zeiss SMT Inc., Pleasanton, CA (US)

( * ) Notice: Subject to any disclaimer, the term of this patent is extended or adjusted under 35 U.S.C. 154(b) by 330 days.

(21) Appl. No.: 17/470,661

(22) Filed: Sep. 9, 2021

(65) Prior Publication Data
US 2021/0404977 A1    Dec. 30, 2021

Related U.S. Application Data

(63) Continuation of application No. PCT/US2020/002318, filed on Mar. 17, 2020.
(Continued)

(30) Foreign Application Priority Data

Jul. 25, 2019  (DE) .......................... 102019120109.8

(51) Int. Cl.
*G01N 23/04*    (2018.01)
*G01N 23/083*   (2018.01)

(52) U.S. Cl.
CPC ........... *G01N 23/04* (2013.01); *G01N 23/083* (2013.01); *G01N 2223/307* (2013.01);
(Continued)

(58) Field of Classification Search
CPC ................. G01N 23/083; G01N 23/04; G01N 2223/307; G01N 2223/309
See application file for complete search history.

(56) References Cited

U.S. PATENT DOCUMENTS 9,557,282 B1 *   1/2017  Shu .......................... G21K 7/00
2011/0294677 A1 * 12/2011  Beckers ............... C08G 77/392
                                                          604/93.01
(Continued)

FOREIGN PATENT DOCUMENTS

CN        104597269 A    5/2015
CN        104991080 B   10/2015
(Continued)

OTHER PUBLICATIONS

Korean Office Action, with translation thereof, for corresponding Appl No. 10-2021-7033494, dated Nov. 28, 2022.
(Continued)

*Primary Examiner* — Chih-Cheng Kao
(74) *Attorney, Agent, or Firm* — Fish & Richardson P.C.

(57) ABSTRACT

A sample holder for holding a sample during an X-ray imaging process includes a sample placement surface on which the sample is placed for positioning the sample in a depth direction of the sample holder. The sample holder also includes a first alignment portion for aligning the sample in a width direction of the sample holder, and a second alignment portion for aligning the sample in a height direction of the sample holder.

20 Claims, 8 Drawing Sheets

Related U.S. Application Data (60) Provisional application No. 62/821,090, filed on Mar. 20, 2019.

(52) U.S. Cl.
CPC .................. *G01N 2223/309* (2013.01); *G01N 2223/6113* (2013.01); *G01N 2223/6462* (2013.01)

(56) References Cited

U.S. PATENT DOCUMENTS

| | | | |
|---|---|---|---|
| 2014/0064445 A1* | 3/2014 | Adler | G01N 23/083 378/43 |
| 2017/0023495 A1 | 1/2017 | Santillan et al. | |
| 2018/0277336 A1* | 9/2018 | Iwahori | H01J 37/26 |

FOREIGN PATENT DOCUMENTS

| | | |
|---|---|---|
| CN | 206573501 U | 10/2017 |
| JP | 2002198097 A | 7/2002 |
| WO | WO2015058162 A1 | 4/2015 |
| WO | WO2018078116 A1 | 5/2018 |
| WO | WO2019010390 A1 | 1/2019 |

OTHER PUBLICATIONS

International Preliminary Report on Patentability for corresponding PCT Appl. No. PCT/US2020/023108, dated Sep. 30, 2021.
GROFA: Bike Workbook 2017/18, Grofa B2B Online Shop: www.grofa.com/haendlerbereich Jan. 1, 2017.
International Search Report and Written Opinion for corresponding PCT Appl. No. PCT/US2020/023108, dated Jul. 21, 2020.

* cited by examiner

SAMPLE HOLDER, SYSTEM AND METHOD

CROSS-REFERENCE TO RELATED APPLICATIONS

The present application is a continuation of, and claims benefit under 35 USC 120 to, international application PCT/US2020/023108, filed Mar. 17, 2020, which claims benefit under 35 USC 119 of German Application No. 10 2019 120 109.8, filed Jul. 25, 2019 and U.S. Ser. No. 62/821,090, Mar. 20, 2019. The entire disclosure of these applications are incorporated by reference herein.

FIELD

The present disclosure relates to a sample holder for holding a sample during an X-ray imaging process, to a system including such a sample holder and to a method for performing an X-ray imaging process using such a sample holder.

BACKGROUND

3D X-ray imaging techniques such as X-ray microscopy (XRM) and microCT have become established failure analysis (FA) tools for bridging fault isolation and physical failure analysis (PFA), because they enable the visualization of defects without having to destroy the device under test. Furthermore, these tools can provide FA analysts with beta) ter information for determining the best approach to conduct PFA for root cause analysis. The XRM advantages of non-destructive, high-resolution imaging can make it an excellent option for routine inspection of semiconductor package features such as traces, C4 bumps, and microbumps. MicroCT is also valuable, although its resolution when applied to larger sample geometries is typically lower than the resolution that can be achieved with XRM. Since XRM and microCT share significant similarities, the terms will be used interchangeably in the rest of the document.

XRM set-up and acquisition times have limited its proliferation and adoption beyond FA and manual measurement applications. XRM workflow improvements offer the opportunity to realize the efficiency and throughput benefits of automated device handling for productivity in high-resolution, site-specific inspection and measurement applications.

For performing XRM, it can be desirable to accurately and repeatably fix one or more samples, for example integrated circuit (IC) packages, to a sample holder such that the sample remains securely held without movement in the presence of X-ray radiation. It is generally desirable that the sample's placement on the sample holder does not significantly vary in all three spatial dimensions between different sample holders or repeated uses on the same sample holder.

SUMMARY

The present disclosure seeks to provide an improved sample holder.

In an aspect, the disclosure provides a sample holder for holding a sample during an X-ray imaging process is provided. The sample holder includes a sample placement surface on which the sample is placed for positioning the sample in a depth direction of the sample holder, a first alignment portion for aligning the sample in a width direction of the sample holder, and a second alignment portion for aligning the sample in a height direction of the sample holder.

Due to the fact that the sample holder has the sample placement surface and the two alignment portions, it is possible to accurately and repeatably position the sample in all three spatial directions. Hence, the sample can remain securely held without movement in the presence of X-ray radiation. It can be the case that the placement of the sample does not significantly vary in the three spatial directions between different sample holders or repeated uses on the same sample holder.

The X-ray imaging process can be XRM. The sample can be an electronic device, for example an IC package. The sample placement surface can be a flat surface of the sample holder on which the sample can be placed. The alignment portions can be bar-shaped and can be arranged on two different edges of the sample placement surface. The sample placement surface can be rectangular. The sample placement surface can easily be adapted to different sizes of the sample. The sample placement surface can be a plane that is defined by the width direction and the height direction.

The first alignment portion can run along the height direction. The second alignment portion can run along the width direction. The first alignment portion can be named vertical ledge. The second alignment portion can be named horizontal ledge. In use of the sample holder, a first edge of the sample can abut the first alignment portion and a second edge of the sample can abut the second alignment portion. The sample can therefore guided by the alignment portions into a corner of a sample receiving section of the sample holder. In a front view of the sample placement surface, the corner can be a right bottom corner of the sample receiving section. The alignment portions can also serve as X-ray alignment marks, for example as so-called fiducials.

The sample holder can have a coordinate system with a first spatial direction or x-direction, a second spatial direction or y-direction and a third spatial direction or z-direction. The spatial directions are arranged perpendicular to each other. The z-direction is understood as the depth direction. The x-direction is understood as the width direction. The y-direction is understood as the height direction.

The sample can be positioned on the sample holder as follows. In a first step, the sample is placed on the sample placement surface for positioning the sample in the depth direction of the sample holder. In a second step, the sample is abutted on the first alignment portion for aligning the sample in the width direction of the sample holder. In a third step, the sample is abutted on the second alignment portion for aligning the sample in the height direction of the sample holder. The afore-mentioned steps can be performed at the same time or one after another. The third step can be performed after the second step or vice versa.

According to an embodiment, the first alignment portion is arranged perpendicular to the sample placement surface, wherein the second alignment portion is arranged perpendicular to the sample placement surface and perpendicular to the first alignment portion.

The sample placement surface, the first alignment portion and the second alignment portion in this way form the box-shaped sample receiving section which receives and aligns the sample in all three spatial directions. Optionally, the sample receiving section is open on two sides, whereas two other sides are closed by the alignment portions that work as side walls of the sample receiving section.

According to an embodiment, a cut-out is placed at an intersection of the first alignment portion and the second alignment portion.

The cut-out can be circular. The cut-out can be a bore that is placed at the intersection of the two alignment portions. The cut-out can receive a corner of the sample.

According to an embodiment, the sample holder further includes a fixing element for pressing the sample against the sample placement surface, against the first alignment portion and against the second alignment portion.

The fixing element can allow a user to exert an adequate holding force between the sample and the sample holder. When using the sample holder, time can be saved by the quick-assembly, quick-release of the samples via the fixing element. No cleaning of the samples and/or the sample holder is needed since no adhesive is used to fix the sample to the sample holder. The fixing element can be used several times.

According to an embodiment, the fixing element runs diagonally over the sample placement surface.

"Diagonally" means that the fixing element runs between two transversely opposite corners of the sample placement surface. Hence, the fixing element also runs diagonally over the sample thus fixing it securely to the sample holder.

According to an embodiment, the fixing element is made of a flexible and radiation-stable material, for example of ethylene propylene diene methylene rubber.

The fixing element can therefore flexible or elastic. In other words, the fixing element can be stretched. The fixing element can be named elastic fixing element. The fixing element can be an O-ring.

According to an embodiment, the sample holder further includes a first hook portion and a second hook portion, wherein the fixing element is hooked into the first hook portion and into the second hook portion.

The first hook portion and the second hook portion can be arranged at two opposite corners of the sample placement surface.

According to an embodiment, the sample placement surface is arranged between the first hook portion and the second hook portion.

The hook portions can be arranged diagonally so that the fixing element runs diagonally over the sample and fixes it to the sample holder.

According to an embodiment, the sample holder further includes a rear surface which is arranged opposite the sample placement surface, wherein the first hook portion has a first notch which is provided in the rear surface for receiving the fixing element, and wherein the second hook portion has a second notch which is provided in the rear surface for receiving the fixing element.

In this way, a good hold of the fixing element can be ensured. The fixing element can thus be prevented from slipping off the hook portions.

According to an embodiment, the first hook portion is arranged flush with the sample placement surface, wherein the second hook portion protrudes from the sample placement surface in the depth direction.

This can have the effect that the fixing element runs inclined with regard to the sample placement surface. This can ensure that the sample is securely pressed against the sample placement surface as well as against the alignment portions. "Flush" means that the first hook portion does not protrude over the sample placement surface.

According to an embodiment, the sample holder further includes a sample receptacle which has a plurality of sample receiving sections, wherein each sample receiving section has a sample placement surface, a first alignment portion and a second alignment portion.

The number of sample receiving sections is arbitrary. For example, there can be three sample receiving sections. Each sample receiving section can be capable of receiving one sample. Each sample receiving section can have a fixing element. When regarded along the height direction, the sample receiving sections can be arranged in a row.

According to an embodiment, the sample receptacle is integrally formed.

The phrase "integrally formed" refers to a structure formed from the same material or materials using a single, continuous process. For example, when the sample receptacle is formed using a three-dimensional printer, the three-dimensional printer can emit the same material or materials during the printing process to form the sample receptacle as a single piece. The sample receptacle can be made of a material that allows the radiation to readily pass through the sample receptacle. The materials used for producing the sample receptacle can include aluminum, glassy carbon, epoxy filled with glass fiber or other low-attenuating and structurally-stable materials.

According to an embodiment, the sample holder further includes a post to which the sample receptacle is attached and a gripper disc to which the post is attached, wherein the post is fixed to the gripper disc in a form-locking manner via a key connection.

The post can be made of aluminum or any other suited material. The post can have a circular cross-section. The sample receptacle can be attached to the post via fixing elements like screws. Additionally, a pin connection between the sample receptacle and the post can be provided. The pin connection can include an alignment pin and two bores for receiving the alignment pin. One bore can be provided at the sample receptacle, and one bore can be provided at the post. The gripper disc can be suitable for being gripped by a gripper or robot. The gripper disc can have a central bore which receives an end of the post. The sample holder can further include a base plate to which the gripper disc is attached. A "form locking" connection can be created by two elements engaging and blocking each other. The post can have a keyway for receiving a key, for example a woodruff key. The central bore of the gripper disc can have a notch for receiving the key. The key connection can securely prevent the post from rotating relative to the gripper disc.

In an aspect, the disclosure provides a system for performing an X-ray imaging process. The system includes a radiation source that emits radiation, a radiation detector that rezo the radiation emitted from the radiation source, and at least one sample holder as explained before, wherein the sample holder is arranged between the radiation source and the radiation detector.

The system can be an XRM system. The System can have a plurality of sample holders. Each sample holder can hold a plurality of samples. The sample holder can hold at least one sample. The radiation detector can receive or detect radiation that passed through the sample and the sample holder.

In an aspect, the disclosure provides a method for performing an X-ray imaging process using a sample holder disclosed herein. The method includes the following method steps: a) placing the sample on the sample holder, b) emitting radiation via a radiation source, and c) receiving radiation passed through the sample via a radiation detector.

As an example, the radiation also passes through the sample holder. The method steps a) to c) can be performed all at the same time or one after another. During performing the X-ray imaging process, the sample holder with the sample or the samples can be rotated stepwise into a plurality of positions. In each position, at least one X-ray image is taken. All the gathered X-ray images together form a three-dimensional data set of the sample, for example of a region of interest of the sample.

The features disclosed for the sample holder are applicable to the system as well as to the method and vice versa.

Further possible implementations or alternative solutions of the disclosure also encomis pass combinations—that are not explicitly mentioned herein—of features described above or below with regard to embodiments. The person skilled in the art may also add individual or isolated aspects and features to the most basic form of the disclosure.

Further embodiments, features and aspects of the present disclosure will become apparent from the subsequent description and claims.

DETAILED DESCRIPTION

In the Figures, like reference numerals designate like or functionally equivalent elements, unless otherwise indicated.

Figure 1:
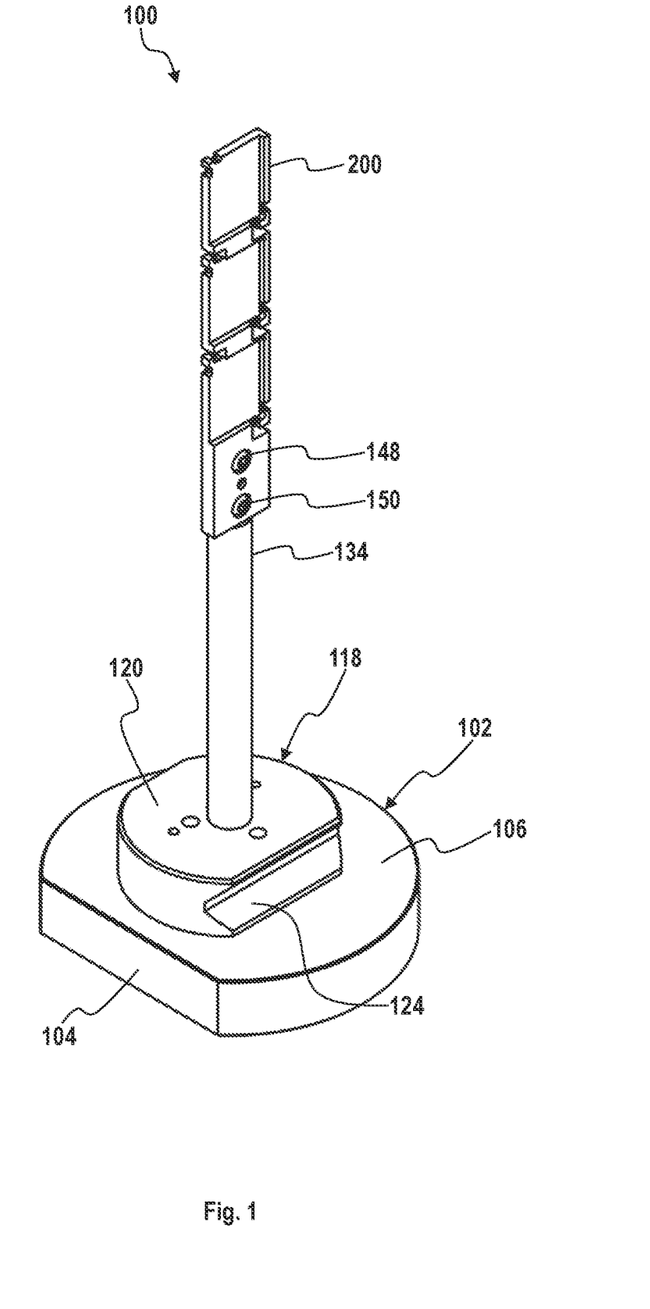
FIG. 1 shows a schematic perspective view of an embodiment of a sample holder.
Figure 2:
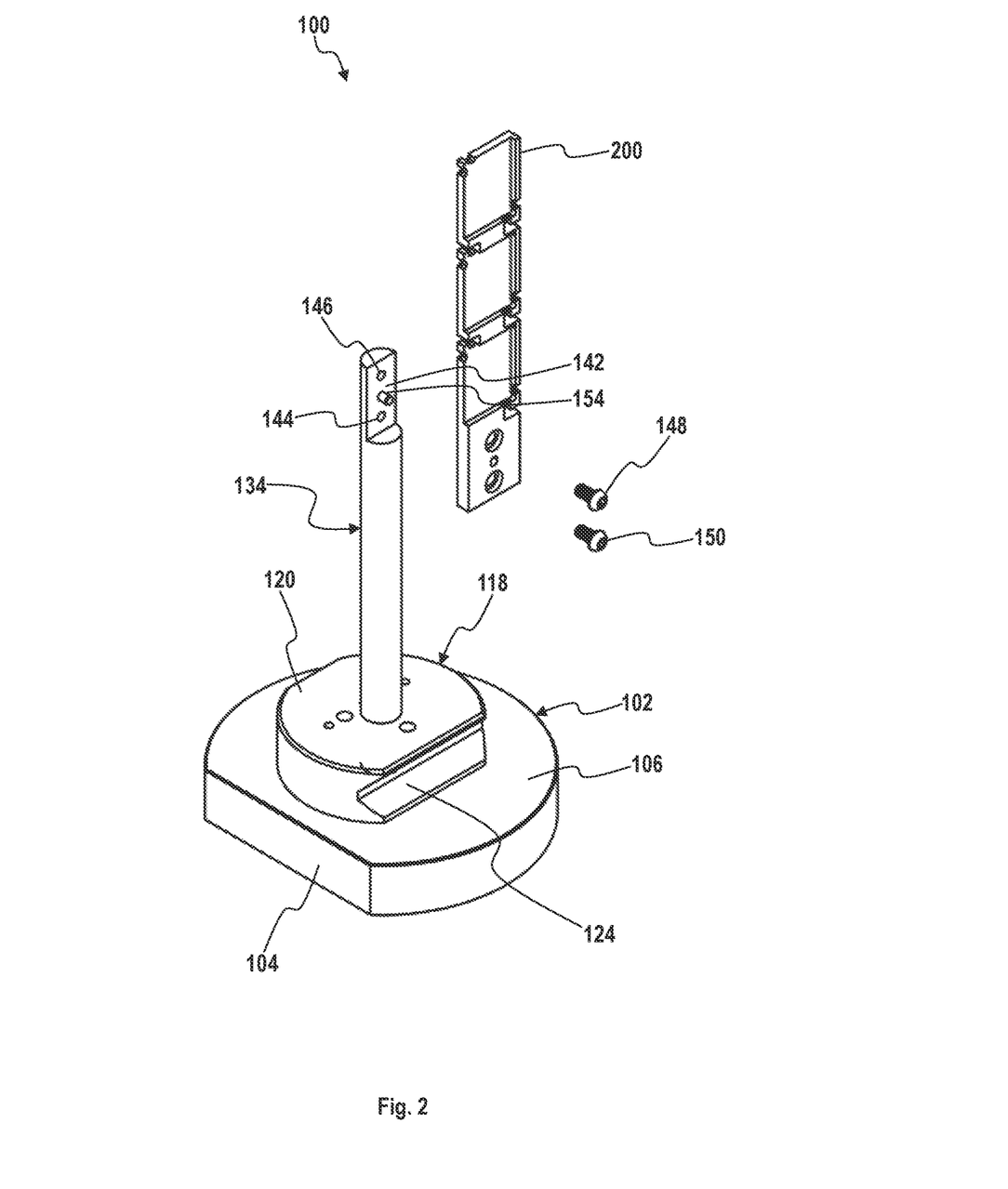
FIG. 2 shows a schematic exploded view of the sample holder of FIG. 1.
Figure 3:
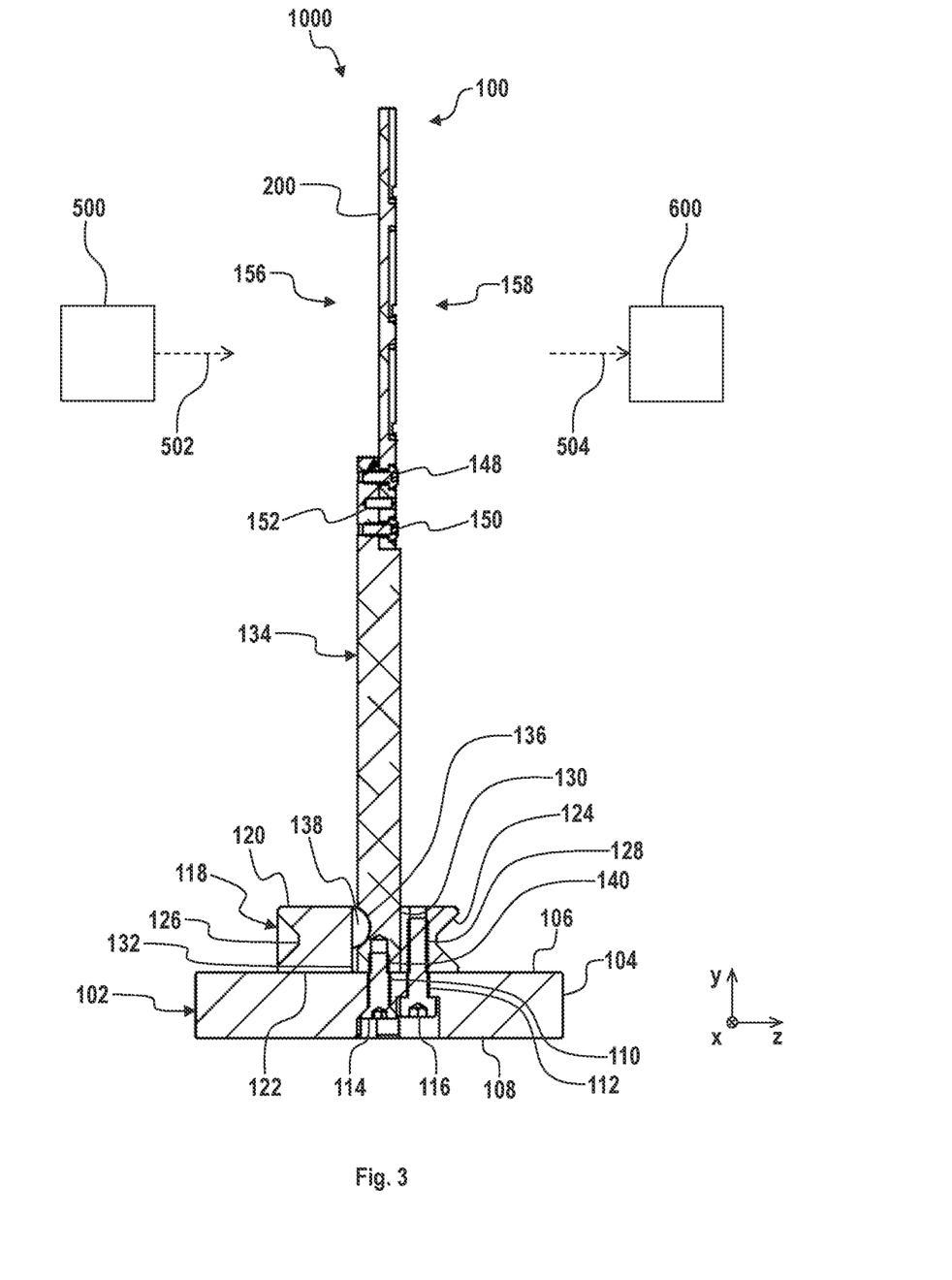
FIG. 3 shows a schematic cross-sectional view of the sample holder of FIG. 1.
Figure 4:
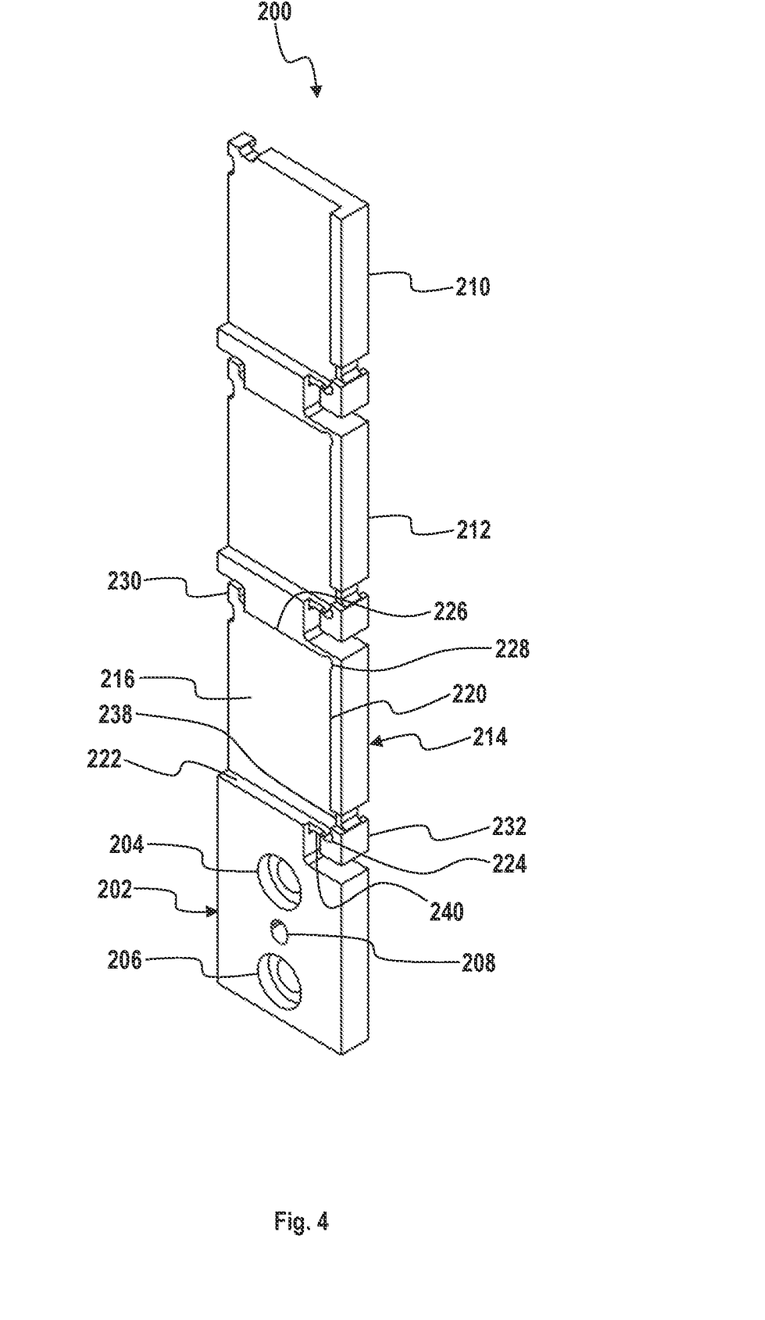
FIG. 4 shows a schematic perspective view of an embodiment of a sample receptacle for the sample holder of FIG. 1.
Figure 5:
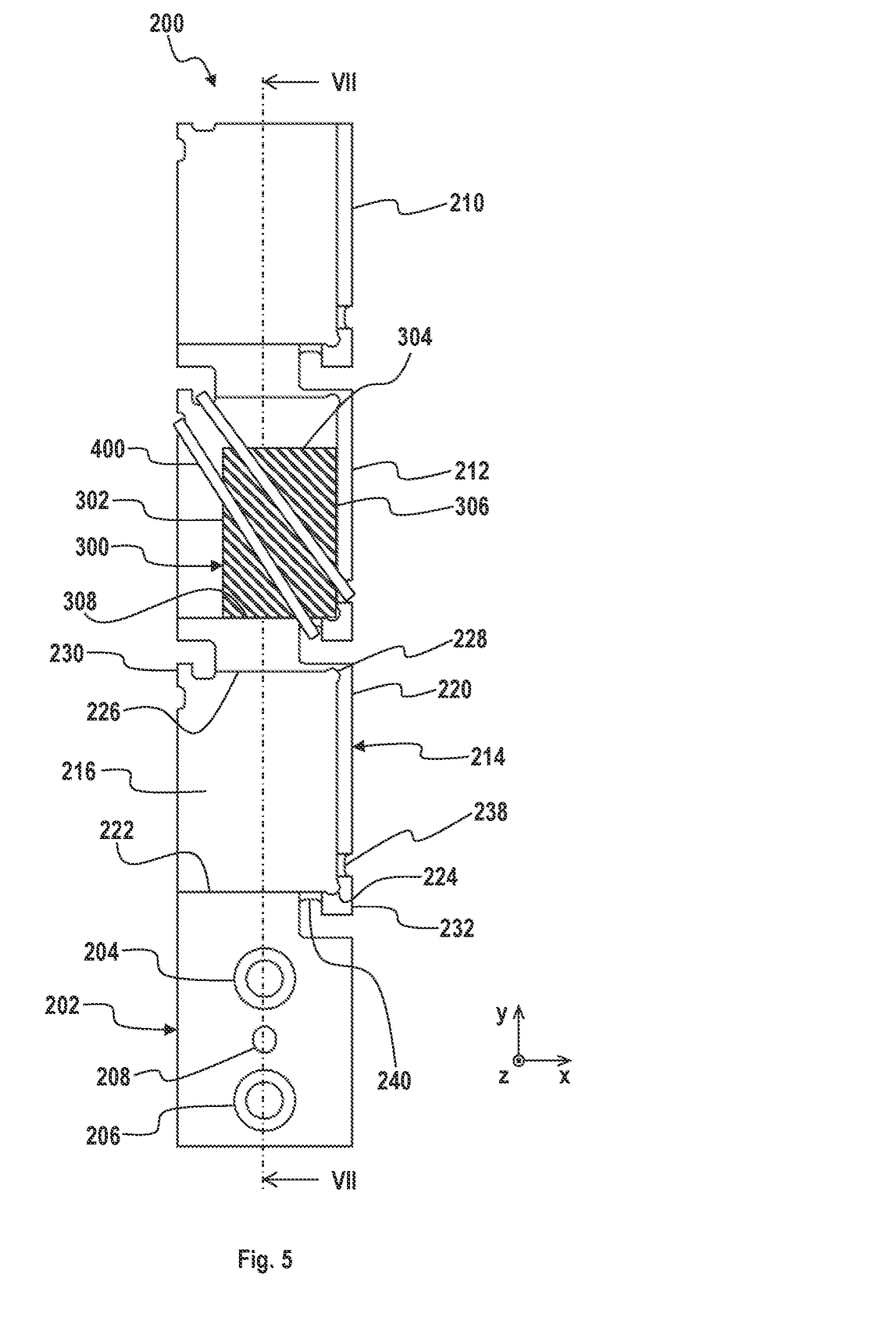
FIG. 5 shows a schematic front view of the sample receptacle of FIG. 4.

FIG. 1 shows a schematic perspective view of an embodiment of a sample holder 100 for holding samples (not shown) during X-ray imaging, for example X-ray CT imaging, of the samples. FIG. 2 shows an exploded view of the sample holder 100. FIG. 3 shows a cross-sectional view of the sample holder 100. In the following, FIGS. 1 to 3 are referred to at the same time.

As an example, the sample holder 100 is used for high-resolution 3D X-ray microscopy (XRM) of semiconductor package interconnects. The sample holder 100 has a base plate 102. The base plate 102 has a flattened cylindrical shape and is provided with a lateral flattening 104. The base plate 102 further has an upper side 106 and a lower side 108. The sides 106, 108 are arranged parallel to each other. The base plate 102 has a stepped bore 110 which is arranged centrally in the base plate 102. The bore 110 breaks through the base plate 102. Further stepped bores 112 are provided in the base plate 102. The number of bores 112 is arbitrary. For example, there are provided three bores 112.

Fixing elements 114, 116 are encompassed in the bores 110, 112. The fixing elements 114, 116 can be screws. The lower side 108 is placed on a stage (not shown). The stage can laterally move the sample holder 100 in a first spatial direction or x-direction x, a second spatial direction or y-direction y and a third spatial direction or z-direction z. In the following, the x-direction x is named width direction of the sample holder 100, the y-direction y is named height direction of the sample holder 100 and the z-direction z is named depth direction of the sample holder 100. The stage can also rotate the sample holder 100 around the height direction y. The base plate 102 can be made of metal. The base plate 102 can be made of aluminum, steel or other suitable materials.

The sample holder 100 further includes a gripper disc 118. The gripper disc 118 has a flat cylindrical shape with an upper side 120 and a lower side 122. The sides 120, 122 are arranged parallel to each other. The lower side 122 is placed on the upper side 106 of the base plate 102. The gripper disc 118 is laterally flattened on two sides. One of the sides has a notch 124, whereas the other side has a conical bore 126. The notch 124 and the bore 126 can be used to grip the sample holder 100 via a gripping robot (not shown).

The gripper disc 118 has a number of threaded bores 128 into which the fixing elements 116 are screwed to fix the gripper disc 118 to the base plate 102. The bores 128 can break through the gripper disc 118. The gripper disc 118 includes a central bore 130 which breaks through the gripper disc 118. The bore 130 is provided with a notch 132 which runs in the height direction y. The gripper disc 118 is made of metal. The gripper disc 118 can be made of aluminum. The gripper disc 118 can also be made of steel or other suitable materials.

A post 134 is received in the bore 130. The post 134 has a keyway 136 which receives a key 138. The key 138 is a woodruff key. The key 138 engages with the notch 132 of the gripper disc 118 and prevents the post 134 from rotating relatively towards the gripper disc 118. The post 134 is fixed to the base plate 102 via the fixing element 114 which is screwed into a central bore 140 of the post 134. Instead of the woodruff key 138, other keys can also be used.

The post 134 can be made of metal. The post 134 can be made of aluminum. Opposite the keyway 136, the post 134 has a lateral flattening 142 with two threaded bores 144, 146. The bores 144, 146 receive fixing elements 148, 150. The fixing elements 148, 150 can be screws. Between the bores 144, 146 a further bore 152 is arranged. The bore 152 receives an alignment dowel or alignment pin 154. The sample holder 100 has a source side 156 which faces a radiation source 500, for example an X-ray source, and a detector side 158 which faces a radiation detector 600, for example an X-ray detector. The radiation source 500 emits radiation 502, for example X-rays. The radiation detector 602 detects radiation 504 passed through the sample holder 100 and the sample placed in the sample holder 100. The sample holder 100, the radiation source 500 and the radiation detector 600 are part of a system 1000 for performing an X-ray imaging process, for example an XRM process. The system 1000 is an XRM system or an X-ray CT system.

The sample holder 100 includes a sample receptacle 200 which is fixed to the post 134 via the alignment pin 154 and the fixing elements 148, 150. The sample receptacle 200 is shown in different views in FIGS. 4 to 7. In the following, FIGS. 4 to 7 are referred to at the same time.

The sample receptacle 200 is made of a material that allows the radiation 502 to readily pass through the sample receptacle 200. For example, the sample receptacle 200 may be formed from a polymeric material such as plastic. In this regard, the sample receptacle 200 may be formed using a three-dimensional printing apparatus ("3D printer") allowing the sample receptacle 200 to include a variety of customizable sizes and shapes to carry a variety of samples. A "three-dimension printer" refers to a printing apparatus that emits a polymeric material in order to form a three-dimensional structure.

However, the sample receptacle 200 may be formed by other methods. For example, the sample receptacle 200 may include a polymeric material which is injection molded into a mold cavity that defines the size and shape of the sample receptacle 200. Further, the sample receptacle 200 may be formed from a block of polymeric or metal material that undergoes a material removal process. The materials used for producing the sample receptacle 200 can include aluminum, glassy carbon, epoxy filled with glass fiber or other low-attenuating and structurally-stable materials.

The sample receptacle 200 can be integrally formed. The sample receptacle 200 is bar-shaped and has a base portion 202 which is fixed to the post 134. The base portion 202 has two stepped bores 204, 206 for receiving the fixing elements 148, 150 and one bore 208 for receiving the alignment pin 154. The alignment pin 154 is used for exactly positioning the sample receptacle 200 at the post 134. The fixing elements 148, 150 are used for attaching the sample receptacle 200 to the post 134.

The sample receptacle 200 includes a number of sample receiving sections 210, 212, 214. The number of sample receiving sections 210, 212, 214 is arbitrary. For example, there are provided three sample receiving sections 210, 212, 214. The sample receptacle 200 may accommodate more or less sample receiving sections 210, 212, 214, depending on the scanning range of the system 1000. Each sample receiving sections 210, 212, 214 is capable of receiving one sample 300 (see FIG. 5). The sample 300 can be an electronic device like an integrated circuit. The sample receiving sections 210, 212, 214 are arranged in a row when being viewed in the height direction y. The sample receiving sections 210, 212, 214 are attached to each other. The sample receiving sections 210, 212, 214 are integrally formed. All sample receiving sections 210, 212, 214 have the same technical features. For this reason, in the following only the sample receiving sections 214 is referred to.

The sample receiving section 214 is generally plate shaped and has a sample placement surface 216 and a rear surface 218. In use of the sample holder 100, the sample placement surface 216 is oriented towards the radiation detector 600 and the rear surface 218 is oriented towards the radiation source 500. The sample 300 is placed on the sample placement surface 216. The sample receiving section 214 has a first alignment portion 220 and a second alignment portion 222. When placing the sample 300 on the sample placement surface 216, the sample 300 can be positioned in the depth direction z. However, the sample holder 100 can be placed such that the sample placement surface 216 faces the radiation source 500 and the rear surface 218 faces the radiation detector 600. So, the sample 300 can be positioned to face the radiation detector 600 or to face the radiation source 500.

The first alignment portion 220 runs along the height direction y and is capable of positioning the sample 300 in the width direction x. The first alignment portion 220 is a vertical ledge or can be named vertical ledge. The second alignment portion 222 runs along the width direction x and is capable of positioning the sample 300 in the height direction y. The second alignment portion 222 is a horizontal ledge or can be named horizontal ledge. The alignment portions 220, 222 are arranged perpendicular to each other. The alignment portions 220, 222 can also serve as X-ray alignment marks, for example as so-called fiducials.

The sample 300 can have four lateral edges 302, 304, 306, 308. When placing the sample 300 on the sample placement surface 216, two of the edges 306, 308 of the sample 300 are guided along the first alignment portion 220 and the second alignment portion 222 till the sample 300 is positioned in a bottom right corner (see FIG. 5) of the sample receiving section 214. Hence, with the sample placement surface 216 and the two alignment portions 220, 222, the sample receiving section 214 is capable of positioning the sample 300 in all three spatial directions x, y, z. Other alignment portions can be used such that the origin of the sample 300 is elsewhere than the bottom right corner of the sample receiving section 214.

A circular cut-out 224 is arranged where the alignment portions 220, 222 intersect. The cut-out 224 receives a corner of the sample 300. The sample placement surface 216 can be bordered by an upper edge 226. The sample receiving section 210 does not have such an upper edge 226. A circular cut-out 228 is provided where the upper edge 226 and the first alignment portion 220 intersect each other.

The sample receiving section 214 further includes a first hook portion 230 and a second hook portion 232 which are arranged diagonally. On the rear surface 218, each hook portion 230, 232 has a notch 234, 236. The first hook portion 230 has a first notch 234. The second hook portion 232 has a second notch 236. The hook portions 230, 232 are capable of receiving an elastic fixing element 400 (see FIG. 5). The second hook portion 232 is arranged between two notches 238, 240 that break through the alignment portions 220, 222. The fixing element 400 runs through the notches 238, 240. Using the fixing element 400, the sample 300 can be pressed against the sample placement surface 216 and against the alignment portions 220, 222.

Figure 6:
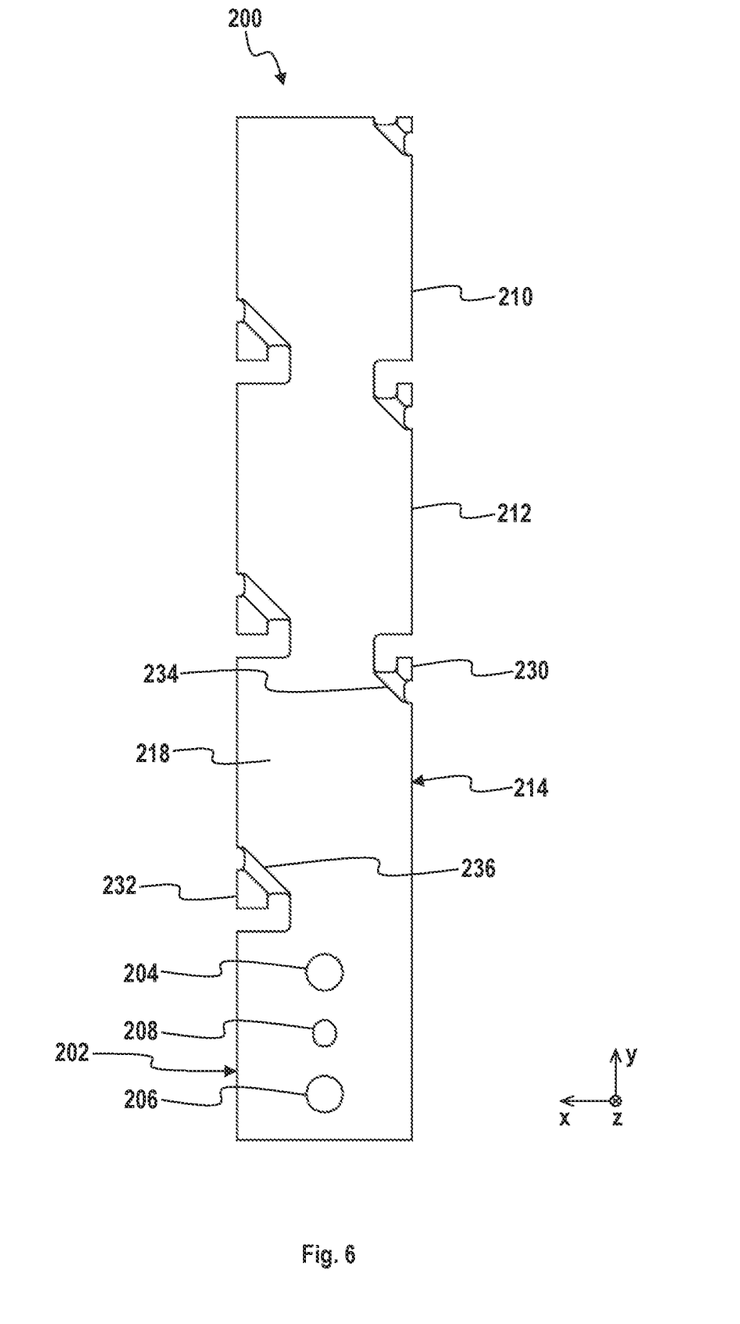
FIG. 6 shows a schematic rear view of the sample receptacle of FIG. 4.
Figure 7:
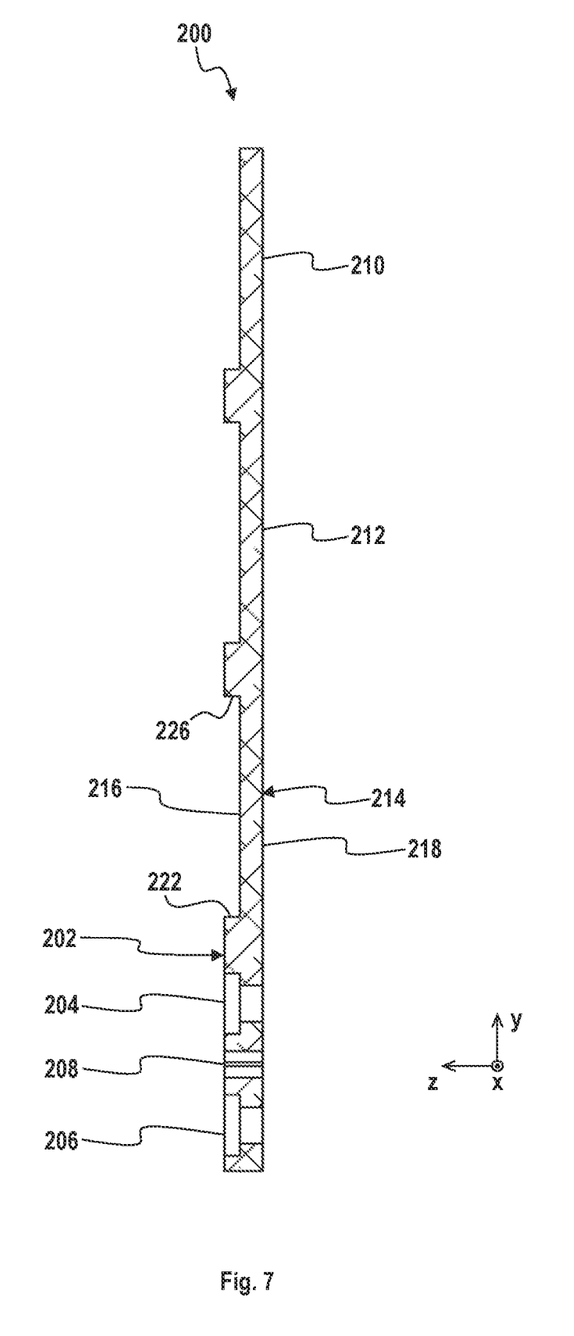
FIG. 7 shows a schematic cross-sectional view of the sample receptacle according to the intersection line VII-VII of FIG. 5.

On the rear surface 218, the fixing element 400 runs through the notches 234, 236. The fixing element 400 can be an O-ring. The fixing element 400 is made of a flexible and radiation-stable material. For example, the fixing element 400 can be made of ethylene propylene diene methylene rubber (EPDM). Using the fixing element 400, the sample 300 can be easily fixed to the sample holder 100 in a non-permanent way. The fixing element 400 imparts a securing force to mate the sample 300 against the sample placement surface 216 and the alignment portions 220, 222.

The function of the sample holder 100 is as follows. In a first step, the sample 300 is placed on the sample placement surface 216 for positioning the sample 300 in the depth direction z of the sample holder 100. In a second step, the sample 300 is abutted on the first alignment portion 220 for aligning the sample 300 in the width direction x of the sample holder 100. In a third step, the sample 300 is abutted on the second alignment portion 222 for aligning the sample 300 in the height direction y of the sample holder 100. The third step can be performed after the second step or vice versa. The aforementioned steps can be performed at the same time or one after another. As an example, the last two steps can be performed by applying the fixing element 400. In other words, the fixing element 400 presses the sample 300 against the alignment portions 200, 222. Alternatively, the fixing element 400 can be applied after performing aligning the sample 300.

On each sample receiving section 210, 212, 214 a sample 300 is placed. The samples 300 are aligned on the sample placement surface 216 of each sample receiving section 210, 212, 214 via the alignment portions 220, 222. Before or after aligning the samples 300, fixing elements 400 are hooked into the hook portions 230, 232 of each sample receiving section 210, 212, 214. The fixing elements 400 press the samples 300 against the sample placement surface 216 and the alignment portions 220, 222. So, a secure and reproduceable positioning of the samples 300 is guaranteed. After fixing the samples 300, the X-ray scanning procedure is done. Optionally, a number, for example fourteen, of sample holders 100 is equipped with samples 300. These sample holders 100 can be tested in the system 1000 one after another. Thereby reducing the operator setup time significantly.

With the afore-mentioned sample holder 100 it is possible to accurately and repeatably fix one or more samples 300, for example IC packages, for X-ray imaging such that the sample 300 or the samples 300 remain securely held without movement in the presence of radiation 502. The placement of the sample 300 or the samples 300 does not significantly vary in the three spatial directions x, y, z between different sample holders 100 or repeated uses on the same sample holder 100.

The sample holder 100 allows for the efficiency of repetitive X-ray CT imaging of like samples 300, optimized for maximum throughput, ease of use, and without altering the physical sample 300. The sample holder 100 thus enables automation of the X-ray CT imaging workflow. The sample holder 100 supports high-resolution imaging amidst the exposure to radiation 502, for example X-rays, for the duration of 3D tomographies. Due to the materials used for the sample holder 100 and the fixing element 400, insignificant degradation of the sample holder 100 and its components over time is to be expected. The sample holder 100 is advantageously suitable for holding samples 300 vertically. The fixing element 400 allows a user to exert an adequate holding force between the sample 300 and the sample receptacle 200.

The radiation-resistance material being used for the fixing element 400 enables longevity and stability to accommodate high-resolution X-ray imaging. As mentioned before, EPDM rubber is a suitable material for the fixing element 400. The sample holder 100 enables accurate and repeatable positioning of samples 300 on the sample holder 100, wherein the positioning is done by the alignment portions 220, 222. With the sample holder 100 it is possible to accommodate one or more samples 300 per sample holder 100. The sample holder 100 is designed for repeatable sample mounting accuracy on the sample holder 100, for example for sample-to-sample, holder-to-holder and holder-tosystem.

Tools for fixing the samples 300 are not necessary. This eases the installation. The sample holder 100 is optimized for maximum X-ray imaging throughput. This is done by using low attenuation materials and a minimal profile depth of the sample receptacle 200. The sample holder 100 does not damage or modify the sample 300 to be held and scanned. The sample holder 100 can be completely made of non-magnetic materials. Thus, the sample holder 100 does not affect the X-rays.

A thermally-stable material is used for the sample holder 100. The material coefficient of thermal expansion accommodates highest resolution scans. The key 138 enables accurate and repeatable assembly of the sample holder 100. The key 138 ensures that the sample 300 maintains a repeatable angular orientation in the X-ray beam path. The sample holder 100 can be shape-optimized to optimize X-ray transmission. This can be done by using cut-outs. Registration features, so called fiducials, may be added to the sample holder 100 for alignment thereof. Unique identifiers, for example barcodes, may be added for autorecognition of the sample holder 100 and the samples 300. Also, laser-engraved identifiers can be used.

The sample holder 100 has a scalable design which can be easily customized for each new sample geometry. A CAD model of the sample holder 100 may be used as input for collision avoidance guidance on the instrument. The sample holder 100 can be packaged with a 3D printer and a design template library. The scalable design allows one to create a new design quickly and with minimal effort to optimize for fast X-ray imaging of samples 300 with slightly different geometry.

When using the sample holder 100, time is saved by the quick-assembly, quick-release of the samples 300. No cleaning of the samples 300 and/or the sample holder 100 is needed since no adhesives are used. Locating regions of interest on the samples 300 for X-ray imaging is easier, since the samples 300 are placed in a repeatable position on the sample holder 100. This position is defined by the design of the sample receptacle 200. Manual alignment steps of the samples 300 can be replaced by automation. A higher yield in imaging can be achieved because due to the exact positioning of the samples 300, it is less likely to have a failed scan and involve re-imaging. Built-in features of the sample holder 100 like the alignment portions 220, 222 may be used as fiducial marks for alignment in the automation recipe. This improves the X-ray scan positional accuracy for all samples 300, saving the time and labor of re-scanning or placement of manual fiducial marks.

Figure 8:
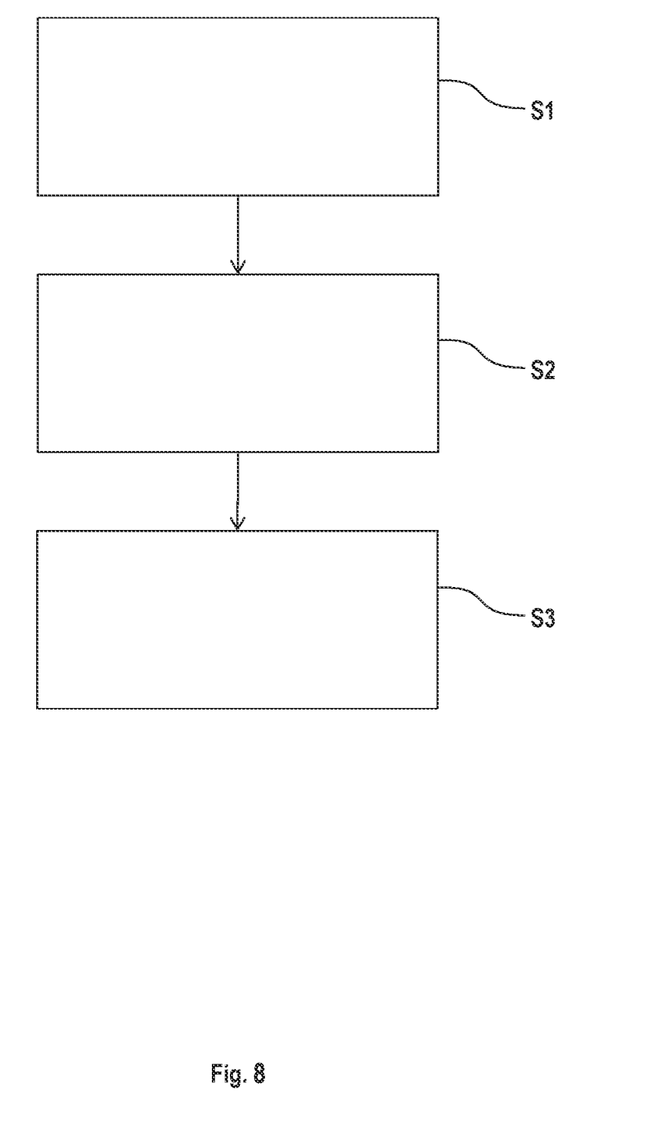
FIG. 8 shows a schematic block diagram of an embodiment of a method for performing an X-ray imaging process using the sample holder according to FIG. 1.

FIG. 8 shows a block diagram of an embodiment of a method for performing an X-ray imaging process using the sample holder 100. The X-ray imaging process is a repetitive 3D imaging and/or measurement process. In a method step S1, the sample 300 is placed on the sample holder 100 as mentioned before. A plurality of samples 300 can be attacked to the sample holder 100 via a plurality of fixing elements 400. In a method step S2, radiation 502 is emitted via the radiation source 500. In a method step S3, radiation 504 passed through the sample 300 is received via the radiation detector 600.

The method steps S1 to S3 can be performed all at the same time or one after another. During performing the X-ray imaging process, the sample holder 100 with the sample 300 or the samples 300 is rotated stepwise into a plurality of positions. In each position, at least one X-ray image is taken. All the gathered X-ray images together form a three-dimensional data set of the sample 300, for example of a region of interest of the sample 300.

Although the present disclosure has been described in accordance with certain embodiments, it is obvious for the person skilled in the art that modifications are possible in all embodiments.

What is claimed is:
1. A sample holder, comprising:
  a sample placement surface configured to support a sample to position the sample in a first direction of the sample holder;
  a first alignment portion configured to align the sample in a second direction of the sample holder;
  a second alignment portion configured to align the sample in a third direction of the sample holder;
  a first hook portion; and
  a fixing element hooked into the first hook portion, the fixing element configured to press the sample against:
    i) the sample placement surface; ii) the first alignment portion; and iii) the second alignment portion, wherein the first direction is perpendicular to the second direction, the first direction is perpendicular to the third direction, and the second direction is perpendicular to the third direction.

2. The sample holder of claim 1, wherein:
the first alignment portion is perpendicular to the sample placement surface;
the second alignment portion is perpendicular to the sample placement surface; and
the second alignment portion is perpendicular to the first alignment portion.

3. The sample holder of claim 1, further comprising a cut-out at an intersection of the first and second alignment portions.

4. The sample holder of claim 1, wherein the fixing element extends diagonally over the sample placement surface.

5. The sample holder of claim 1, wherein the fixing element comprises a flexible and radiation-stable material.

6. The sample holder of claim 1, wherein the fixing element comprises ethylene propylene diene methylene rubber.

7. The sample holder of claim 1, further comprising a second hook portion, wherein the fixing element is hooked into the second hook portion.

8. The sample holder of claim 7, wherein the sample placement surface is between the first and second hook portions.

9. The sample holder of claim 8, further comprising a rear surface opposite the sample placement surface, wherein the first hook portion comprises a notch in the rear surface to receive the fixing element, and the second hook portion comprises a notch in the rear surface to receive the fixing element.

10. The sample holder of claim 9, wherein the first hook portion is flush with the sample placement surface, and the second hook portion protrudes from the sample placement surface in the first direction.

11. The sample holder of claim 7, further comprising a rear surface opposite the sample placement surface, wherein the first hook portion comprises a notch in the rear surface to receive the fixing element, and the second hook portion comprises a notch in the rear surface to receive the fixing element.

12. The sample holder of claim 11, wherein the first hook portion is flush with the sample placement surface, and the second hook portion protrudes from the sample placement surface in the first direction.

13. The sample holder of claim 7, wherein the first hook portion is flush with the sample placement surface, and the second hook portion protrudes from the sample placement surface in the first direction.

14. The sample holder of claim 1, further comprising a sample receptacle comprising a plurality of sample receiving sections, wherein each sample receiving section comprises a sample placement surface, a first alignment portion and a second alignment portion.

15. The sample holder of claim 14, wherein the sample receptacle is integrally formed.

16. The sample holder of claim 14, further comprising a post to which the sample receptacle is attached and a gripper disc to which the post is attached, wherein the post is fixed to the gripper disc in a form-locking manner by a key connection.

17. A system, comprising:
a radiation source configured to emit X-ray radiation;
a radiation detector configured to receive X-ray radiation emitted from the radiation source; and
a sample holder according to claim 1,
wherein the sample holder is between the radiation source and the radiation detector along a path of the X-ray radiation.

18. A method, comprising:
placing a sample on the sample holder of claim 1; and
passing X-ray radiation through the sample.

19. The method of claim 18, further comprising using a detector to X-ray radiation that has passed through the sample.

20. A sample holder, comprising:
a sample placement surface configured to support a sample to position the sample in a first direction of the sample holder;
a first alignment portion configured to align the sample in a second direction of the sample holder;
a second alignment portion configured to align the sample in a third direction of the sample holder;
a sample receptacle comprising a plurality of sample receiving sections;
a post to which the sample receptacle is attached;
a gripper disc to which the post is attached; and
a fixing element configured to press the sample against: i) the sample placement surface; ii) the first alignment portion; and iii) the second alignment portion,
wherein:
the first direction is perpendicular to the second direction;
the first direction is perpendicular to the third direction;
the second direction is perpendicular to the third direction;
each sample receiving section comprises a sample placement surface, a first alignment portion and a second alignment portion; and
the post is fixed to the gripper disc in a form-locking manner by a key connection.

* * * * *

UNITED STATES PATENT AND TRADEMARK OFFICE
CERTIFICATE OF CORRECTION

PATENT NO. : 12,007,339 B2
APPLICATION NO. : 17/470661
DATED : June 11, 2024
INVENTOR(S) : Thomas Anthony Case et al.

Page 1 of 1

It is certified that error appears in the above-identified patent and that said Letters Patent is hereby corrected as shown below:

On the Title Page

Column 1, Item (63), delete "PCT/US2020/002318," insert --PCT/US2020/023108,--.

In the Specification

Column 1, Line 29-30, delete "bet) ter" insert --better--.

Column 4, Line 48, delete "rezo" insert --receives--.

Column 5, Line 9, delete "encomis pass" insert --encompass--.

Column 9, Line 46-47, delete "holder-tosystem" insert --holder-to-system--.

Column 9-10, Line 67, delete "autorecognition" insert --auto-recognition--.

Column 10, Line 36, delete "attacked" insert --attached--.

In the Claims

Column 12, Line 24, Claim 19, after "to" insert --receive--.

Signed and Sealed this
Twenty-fourth Day of September, 2024

Katherine Kelly Vidal
*Director of the United States Patent and Trademark Office*